United States Patent [19]
Ray et al.

[11] 4,353,749
[45] Oct. 12, 1982

[54] PROCESS OF PRODUCING A USEFUL SOIL CEMENT PRODUCT FROM INDUSTRIAL CHEMICAL WASTE

[76] Inventors: Louis F. Ray, 5441 Heatherstone, Baton Rouge, La. 70808; David G. Azar, Sr., 11023 Major Oaks Dr., Baton Rouge, La. 70815

[21] Appl. No.: 199,909

[22] Filed: Oct. 23, 1980

[51] Int. Cl.$^3$ ................................................ C04B 7/02
[52] U.S. Cl. ..................................... 106/97; 106/109; 106/DIG. 1
[58] Field of Search ............. 106/89, 97, 109, DIG. 1

[56] References Cited

U.S. PATENT DOCUMENTS 2,302,988  11/1942  Witty ..................................... 106/97

FOREIGN PATENT DOCUMENTS

| 48-91626 | 12/1973 | Japan | 106/97 |
| 49-45892 | 5/1974 | Japan | 106/97 |
| 52-16522 | 2/1977 | Japan | 106/97 |
| 4055 | 7/1978 | U.S.S.R. | 106/DIG. 1 |

*Primary Examiner*—James Poer
*Attorney, Agent, or Firm*—David L. Ray

[57] ABSTRACT

Acid industrial waste containing calcium sulfate is reacted and neutralized with another alkaline industrial waste preferably containing iron oxide and aluminum oxide, mixed with water and stabilized with either Portland cement of fly ash to produce a chemically neutral and useful product in the form of soil cement.

4 Claims, No Drawings

PROCESS OF PRODUCING A USEFUL SOIL CEMENT PRODUCT FROM INDUSTRIAL CHEMICAL WASTE

BACKGROUND OF THE INVENTION

The disposal of industrial chemical waste has been a long standing problem which is particularly acute today with popular demand and Government regulations for reducing pollution of the environment. However, it is a fact of life that chemical waste or residue is produced by almost every industrial process known to man.

In particular, in the Baton Rouge area of Louisiana there exist huge stock piles of waste products. One stock pile contains the residue or waste product from a process of digesting phosphate rock in sulfuric acid in an industrial process which leaves as a waste product calcium sulfate in an acid medium. Another stock pile contains the residue from an industrial process in which bauxite is digested in concentrated caustic soda, the residue being in the form of ponds of waste material containing clay, iron ore ($Fe_2O_3$) and alumina ($Al_2O_3$) in an alkaline medium.

These huge stock piles have existed for years because there was thought to be no use for them and because disposal of them by conventional methods would result in contamination of the environment. While attempts have been made to use waste gypsum from the reaction of phosphate rock with sulfuric acid to produce Portland cement, as disclosed in U.S. Pat. No. 3,717,489, it has not been used as in the present invention.

SUMMARY OF THE INVENTION

The primary object of the present invention is to provide a process which both provides for the economic and environmentally safe disposal of such waste products and also for the mixture and treatment of such waste products to produce a useful product.

A more specific object of the invention is to blend these acid and alkaline waste products together to form a mixture having a pH range of about 7.0 to 10.0 and to blend with this mixture water and either Portland cement or fly ash to produce a soil cement which is useful in roadway pavement, for example.

Still another object of my invention is to remove the moisture from this soil cement to produce a dry product and then place this product in suitable bags for use as rip rap.

DETAILED DESCRIPTION OF THE INVENTION

Soil cement is a highly compacted mixture of a soil material, cement and/or fly ash, and water and is frequently used as a low-cost pavement. It has been found that certain acid industrial wastes can be neutralized and stabilized in a soil cement composition to produce an inexpensive, environmentally safe and useful product. The wastes give the product exceptional compressive strength. In a preferred embodiment of the invention acid industrial wastes containing calcium sulfate are neutralized with an alkaline waste having a fine particle size and mixed with Portland cement or fly ash to produce a safe, durable and high strength product.

Acid industrial wastes suitable for use in the present invention preferably contain a mixture of anhydrite ($CaSO_4$) and gypsum, $CaSO_4.2H_2O$. The calcium sulfate content of the waste is preferably 25 to 100% based on the solids present (unless otherwise indicated all percentages are based on solid weight). This waste may be derived from a number of industrial processes, a prime example of which is the digestion of phosphate rock with sulfuric acid.

The pH of the acid waste will depend on its source. Substantially any acidic calcium sulfate-containing acid waste can be used in the present invention. Typically, however, the pH of the waste will be about 1.5 to 6.5. To obtain a uniform mix and a product having good strength, the particle size of the acid waste should be less than 50 mesh, and preferably at least 50 to 80% of the acid waste solids should pass through a 325 mesh sieve. In the manufacture of useful products in accordance with the present invention, the wastes are often pumped as a slurry or wet feed from a stockpile or storage pond to the cement mixing site. To facilitate this transport, the dry acid waste preferably possesses a bulk density of about 80 to 110 lbs/cu ft.

In most cases, the acid waste is neutralized before stabilization. For this purpose, an alkaline industrial waste is employed. The alkaline industrial waste can be substantially any alkaline waste material which, when mixed with the acid waste in quantities providing an adequate compressive strength, yields a mixture having a pH of about 7.0 to 10 and preferably 7.5 to 8.0. The pH of the alkaline waste itself can range from 7.5 to 12.5 depending on the source. One waste that has been found particularly well-suited for use in the present invention is the residue by-product of digesting bauxite in concentrated caustic soda. This waste generally contains iron oxide and aluminum oxide in an amount of about 30 to 80% and silicon dioxide (clay) in an amount of 5 to 20%. In this regard, however, it is noted that the chemical composition of the alkaline waste is not particularly critical as long as it does not interfere with obtaining a high-compressive strength product. Thus, the residue from digesting bauxite in concentrated caustic soda is preferred because it does not generate gas when it reacts with the acid waste or detract from the strength of the cement product in any other fashion. It is particularly preferred for its very fine particle size, which efficiently fills the voids in the cement-waste mix and its content of argillaceous material. In general, the alkaline waste should have a particle size less than about 50 mesh, and preferably at least 80% of the alkaline waste solids should pass through a 400 mesh screen. To facilitate its transport (pumping), the waste is used as a slurry having a dry bulk density of about 60–90 lbs/cu ft.

The alkaline waste and the acid waste are mixed in amounts that provide a mixture having a pH of about 7.0 to 10.0 as pointed out above. The mixing ratio depends on the respective pH of the wastes. In a typical case, a blend will contain 2 to 40% alkaline waste and 60 to 90% acid waste (as solids). Compacted, the blended wastes preferably have a wet density of 95 to 120 lbs/cu ft., and a dry density of about 80 to 110 lbs/cu ft measured in accordance with ASTM D-698.

In accordance with the present invention, the industrial waste is stabilized by adding thereto any of Type I to V Portland Cement, fly ash or a combination thereof and water. The amount of cement and/or fly ash used in the mixture will depend on the properties desired in the product, but, in general, high-strength products can be obtained by mixing the blended wastes with 1 to 30% cement or 1 to 30% fly ash, or a mixture thereof falling within the aforesaid ranges. It will be apparent to those skilled in the art, however, that the actual amounts can vary depending on the mineral content of the wastes, the pH of the blend and depending on the design strength specified.

The amount of water added to the mix is adjusted to obtain maximum compaction in a manner well known in the art. Typically, soil cement compositions prepared using industrial wastes in accordance with the present invention contain about 13 to 30% water.

The waste-cement/fly ash water mixture prepared above may be compounded with conventional soil materials including sand, silt, clay, gravel or crushed rock, slag, caliche, lime rock, scoria, cinders, fly ash and screenings from quarries and gravel pits. Normally, pugmill-type mixers are used. The mixture is then compacted and cured in a conventional manner.

The product of the present invention can be used as a pavement for roadways, residential streets, parking areas, etc., as well as revetment structures. In the latter case the wastes and cement are mixed dry, bagged and placed on, for example, a river bank where, upon absorbing water, they harden into a permanent embankment.

The present invention will be further illustrated by the following non-limiting examples.

EXAMPLE 1

A soil cement was prepared by blending acid wastes from digesting phosphate rock with sulfuric acid having a pH of 4.3, a gypsum content of 65% (solids), an anhydrite content of 20% (solids), a moisture content of 15% and a particle size of 80% passing a 325 mesh sieve with the alkaline waste from digesting bauxite with caustic soda. This alkaline waste contained iron oxide 65.8%; aluminum oxide 9.3%, and silicon dioxide 21.2% and possessed a pH of about 10.2 and a particle size of 80% passing a 400 mesh sieve.

The wastes were blended in a ratio of 9 parts acid waste to 1 part alkaline waste (solids) to provide a blend having a pH of 7.9. This blend was mixed with 3% Type I Portland Cement and 14% water, compacted and cured to produce a high-strength product having an unconfined compressive strength (measured in accordance with ASTM D-2166 (4 hr soak)) of 50-100 psi.

In a similar manner, soil cement products were obtained using 5% and 7% Type I Portland Cement. These products possessed unconfined compressive strengths of 100-250 psi and 200-500 psi, respectively.

EXAMPLE 2

Example 1 was repeated substituting 5%, 7% and 9% fly ash, (CaO content: 15%) for the Portland Cement in Example 1. The following results were obtained:

| Fly Ash | Compressive Strength |
| --- | --- |
| 5% | 0–100 psi |
| 7% | 50–200 psi |
| 9% | 100–400 psi |

While the invention has been described in detail and with reference to specific embodiments thereof, it will be apparent to one skilled in the art that various changes and modifications can be made therein without departing from the spirit and scope thereof.

What is claimed is:

1. A process for producing an environmentally safe and useful product, said process consisting essentially of the steps of mechanically mixing an acid waste having a particle size such that it passes a 50 mesh sieve, 25% to 100% by weight calcium sulfate, and a pH of about 1.5 to 6.5 with an alkaline waste material having a particle size such that all of said alkaline material passes a 50 mesh sieve, said alkaline waste material having a pH from about 7.5 to 12.5, the blend of said acid waste and said alkaline waste having a pH of about 7.0 to 10.0, and mixing said blend with 1% to 30% by weight of either Portland cement and/or fly ash and water, compacting said mixture, and curing said mixture to form a soil cement product.

2. The process of claim 1 wherein said alkaline waste is a by-product of digesting bauxite and with caustic soda and wherein said alkaline waste contains iron oxide and aluminimum oxide in an amount of about 30% to 80% and silicon dioxide clay in the amount of about 5% to 20%.

3. The process of claim 1 wherein said acid waste contains a mixture of gypsum and anhydrite.

4. The process of claim 1 wherein said acid waste is a by-product of digesting phosphate rock with sulfuric acid.

* * * * *